United States Patent
Lee et al.

(10) Patent No.: US 9,680,191 B2
(45) Date of Patent: Jun. 13, 2017

(54) ELECTROLYTE FOR LITHIUM AIR BATTERY AND LITHIUM AIR BATTERY INCLUDING THE SAME

(75) Inventors: Dong-joon Lee, Seoul (KR); Victor Roev, Suwon-si (KR); Young-gyoon Ryu, Suwon-si (KR); Dong-min Im, Seoul (KR); Min-sik Park, Suwon-si (KR); Sang-bok Ma, Yongin-si (KR); Osamu Yamamoto, Tsu (JP); Nobuyuki Imanishi, Tsu (JP); Yasuo Takeda, Tsu (JP)

(73) Assignees: SAMSUNG ELECTRONICS CO., LTD, Gyeonggi-Do (KR); NATIONAL UNIVERSITY CORPORATION MIE UNIVERSITY, Mie Prefecture (JP)

( * ) Notice: Subject to any disclaimer, the term of this patent is extended or adjusted under 35 U.S.C. 154(b) by 829 days.

(21) Appl. No.: 13/616,774

(22) Filed: Sep. 14, 2012

(65) Prior Publication Data

US 2013/0108934 A1    May 2, 2013

(30) Foreign Application Priority Data

Oct. 27, 2011 (KR) .................. 10-2011-0110718

(51) Int. Cl.
*H01M 12/08* (2006.01)
*H01M 10/056* (2010.01)
(Continued)

(52) U.S. Cl.
CPC ......... *H01M 12/06* (2013.01); *H01M 10/052* (2013.01); *H01M 10/0525* (2013.01);
(Continued)

(58) Field of Classification Search
CPC .......... H01M 10/052; H01M 10/0525; H01M 10/0565; H01M 10/0569; H01M 12/06;
(Continued)

(56) References Cited

U.S. PATENT DOCUMENTS 4,792,504 A * 12/1988 Schwab ............... H01M 6/181
  252/62.2
7,670,724 B1 3/2010 Chan et al.
(Continued)

FOREIGN PATENT DOCUMENTS

CN 101165964 A 4/2008
EP 2647081 10/2013
(Continued)

OTHER PUBLICATIONS

KR 10-2004-0000129—An electrolyte for a lithium ion battery and a lithiumion battery comprising the same (K-PION English translation—Abstract).*

(Continued)

*Primary Examiner* — Carlos Barcena
(74) *Attorney, Agent, or Firm* — Cantor Colburn LLP

(57) ABSTRACT

A lithium air battery including an electrolyte including lithium ion conductive polymers and lithium salts between a positive electrode and a lithium ion conductive solid electrolyte membrane. The lithium ion conductive polymers are hydrophilic matrix polymers.

17 Claims, 4 Drawing Sheets

(51) Int. Cl.
*H01M 12/06* (2006.01)
*H01M 10/052* (2010.01)
*H01M 10/0525* (2010.01)
*H01M 10/0565* (2010.01)
*H01M 10/0569* (2010.01)
*H01M 4/36* (2006.01)

(52) U.S. Cl.
CPC ... *H01M 10/0565* (2013.01); *H01M 10/0569* (2013.01); *H01M 12/08* (2013.01); *H01M 4/364* (2013.01); *H01M 4/366* (2013.01); *H01M 2300/0085* (2013.01); *Y02E 60/128* (2013.01)

(58) Field of Classification Search
CPC ......... H01M 12/08; H01M 2300/0085; H01M 4/364; H01M 4/366
See application file for complete search history.

(56) References Cited

U.S. PATENT DOCUMENTS

| | | | |
|---|---|---|---|
| 7,691,536 | B2 | 4/2010 | Johnson |
| 9,312,583 | B2* | 4/2016 | Lee ................. H01M 12/08 |
| 2004/0191617 | A1 | 9/2004 | Visco et al. |
| 2005/0175894 | A1* | 8/2005 | Visco et al. ............ 429/212 |
| 2007/0117007 | A1* | 5/2007 | Visco et al. ............ 429/144 |
| 2008/0070087 | A1* | 3/2008 | Johnson ............ H01M 6/187 429/405 |
| 2010/0068628 | A1 | 3/2010 | Ueda |
| 2010/0143791 | A1* | 6/2010 | Park et al. ............ 429/164 |
| 2010/0174113 | A1 | 7/2010 | Sanchez et al. |
| 2012/0270115 | A1* | 10/2012 | Johnson ............ H01M 4/96 429/405 |

FOREIGN PATENT DOCUMENTS

| | | | |
|---|---|---|---|
| JP | 1294768 A | 11/1989 | |
| JP | 2003-100348 | 4/2003 | |
| JP | 2005235774 A | 9/2005 | |
| JP | 2009104891 A | 5/2009 | |
| JP | 2010-3694 | 1/2010 | |
| KR | 20040000129 A * | 1/2004 | ........ H01M 10/0525 |

OTHER PUBLICATIONS

European Examination Report for Application No. 12 187 845.8-1359 dated May 27, 2015.
Extended European Search Report for Application No. 12187845.8-1227 dated Jan. 30, 2013.
Cormac O. Laoire, et al.; Rechargeable Lithium/TEGDME-LiPF6/O2 Battery; Journal of the Electrochemical Society, 158 (3), pp. A302-A08; 2011.
Jusef Hassoun, et al.; Investigation of the O2 Electrochemistry in a Polymer Electrolyte Solid-State Cell; Angew. Chem. Int. Ed. 2011, 50, pp. 2999-3002; DOI: 10.1002/anie.201006264.
Chinese Office Action issued in CN Application No. 201210392615.4; Nov. 17, 2015; 8 pages (with English Translation).
Office Action issued in JP Application No. 2012-236617, Filing Date Oct. 26, 2012; OA mail date Apr. 4, 2016; 4 pages (English Translation Provided).
Japanese Office Action for Application No. 2012-236617 dated Jan. 4, 2017, citing the above reference(s).

* cited by examiner

ELECTROLYTE FOR LITHIUM AIR BATTERY AND LITHIUM AIR BATTERY INCLUDING THE SAME

CROSS-REFERENCE TO RELATED APPLICATIONS

This application claims the benefit of Korean Patent Application No. 10-2011-0110718, filed on Oct. 27, 2011 in the Korean Intellectual Property Office, the disclosure of which is incorporated herein in its entirety by reference.

BACKGROUND

1. Field

Aspects of the present disclosure relate to an electrolyte for a lithium air battery and a lithium air battery including the same.

2. Description of the Related Art

Lithium air batteries include a negative electrode in which lithium ions are intercalatable and deintercalatable, a positive electrode including oxygen as a positive active material and a redox catalyst of oxygen, and a lithium ion conductive medium between the positive electrode and the negative electrode.

Lithium air batteries have a theoretical energy density of 3000 Wh/kg or greater, which is about 10 times greater than that of lithium ion batteries. In addition, lithium air batteries are environmentally safe and have better stability than lithium ion batteries. Thus, lithium air batteries have been actively developed.

Lithium air batteries may use an aqueous electrolyte or a non-aqueous electrolyte as the lithium ion conductive medium. However, evaporation of the electrolyte degrades the performance of the battery, and thus a method to prevent this is desirable.

SUMMARY

Aspects of the present invention provide an evaporation-inhibited electrolyte for a lithium air battery and a lithium air battery with improved electrical characteristics including the electrolyte.

According to an aspect of the present invention, a lithium air battery includes a negative electrode wherein lithium ions are intercalatable and deintercalatable; a lithium ion conductive solid electrolyte membrane; and a positive electrode using oxygen as a positive electrode active material, wherein a first electrolyte comprising lithium ion conductive polymers, compounds represented by Formula 1 below, and lithium salts are included between the lithium ion conductive solid electrolyte membrane and the positive electrode:

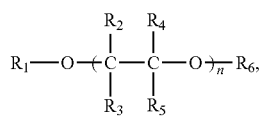

Formula 1 wherein $R_1$ and $R_6$ each independently may represent a hydrogen atom, a nitro group, an amino group, a halogen atom, a cyano group, a carboxyl group, a substituted or unsubstituted C1-C20 alkyl group, a substituted or unsubstituted C6-C30 aryl group, a substituted or unsubstituted C3-C20 heteroaryl group, or a substituted or unsubstituted C3-C20 carbocyclic group;

$R_2$ through $R_5$ each independently may represent a hydrogen atom, a nitro group, an amino group, a hydroxy group, a halogen atom, a cyano group, a carboxyl group, a substituted or unsubstituted C1-C20 alkyl group, a substituted or unsubstituted C2-C20 alkenyl group, a substituted or unsubstituted C2-C20 alkynyl group, a substituted or unsubstituted C1-C20 alkoxy group, a substituted or unsubstituted C2-C20 alkoxy carbonyl group, a substituted or unsubstituted C6-C30 heteroaryl group, a substituted or unsubstituted C2-C20 alkylcarbonyl group, a substituted or unsubstituted C7-C30 arylcarbonyl group, or a substituted or unsubstituted C4-C30 heteroarylcarbonyl group; and n may be in a range of 1 to 20.

The lithium ion conductive solid electrolyte membrane may be disposed between the negative electrode and the positive electrode and also may be formed on one surface of the negative electrode.

A second electrolyte may be further included between the negative electrode and the lithium ion conductive solid electrolyte membrane. The second electrolyte may be a liquid electrolyte including a non-aqueous solvent and lithium salts, an inorganic solid electrolyte membrane, a solid polymer electrolyte membrane, or a combination thereof.

A separator may be further disposed between the lithium ion conductive solid electrolyte membrane and the positive electrode.

According to another aspect of the present invention, a first electrolyte for a lithium air battery, the first electrolyte includes lithium ion conductive polymers, compounds represented by Formula 1 below and lithium salts:

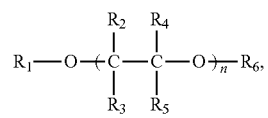

Formula 1 wherein $R_1$ and $R_6$ each independently may represent a hydrogen atom, a nitro group, an amino group, a halogen atom, a cyano group, a carboxyl group, a substituted or unsubstituted C1-C20 alkyl group, a substituted or unsubstituted C6-C30 aryl group, a substituted or unsubstituted C3-C20 heteroaryl group, or a substituted or unsubstituted C3-C20 carbocyclic group;

$R_2$ through $R_5$ each independently represents a hydrogen atom, a nitro group, an amino group, a hydroxy group, a halogen atom, a cyano group, a carboxyl group, a substituted or unsubstituted C1-C20 alkyl group, a substituted or unsubstituted C2-C20 alkenyl group, a substituted or unsubstituted C2-C20 alkynyl group, a substituted or unsubstituted C1-C20 alkoxy group, a substituted or unsubstituted C2-C20 alkoxy carbonyl group, a substituted or unsubstituted C6-C30 aryl, a substituted or unsubstituted C3-C20 carbocylic group, a substituted or unsubstituted C3-C30 heteroaryl group, a substituted or unsubstituted C2-C20 alkylcarbonyl group, a substituted or unsubstituted C7-C30 arylcarbonyl group, or a substituted or unsubstituted C4-C30 heteroarylcarbonyl group; and n is in a range of 1 to 20.

According to another aspect of the present invention, a lithium air battery includes the electrolyte mentioned above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
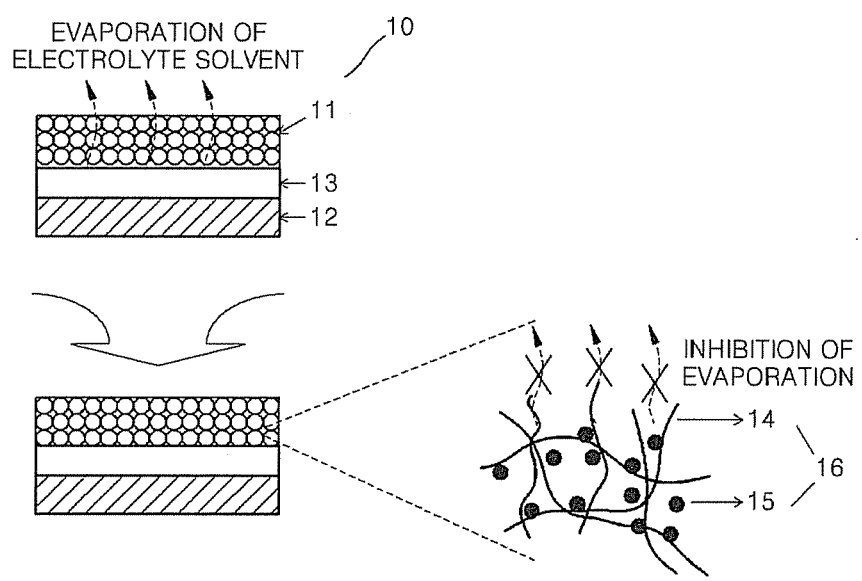
FIG. 1 is a drawing showing the working principle of a lithium air battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A lithium air battery according to an embodiment includes a negative electrode in which lithium ions are intercalatable and deintercalatable; a lithium ion conductive solid electrolyte membrane; and a positive electrode using oxygen as a positive electrode active material, wherein a first electrolyte including lithium ion conductive polymers, compounds represented by Formula 1 below and lithium salts are included between the lithium ion conductive solid electrolyte membrane and the positive electrode:

Formula 1

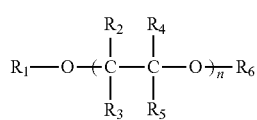

(1)

In Formula 1, $R_1$ and $R_6$ each independently represents a hydrogen atom, a nitro group, an amino group, a halogen atom, a cyano group, a carboxyl group, a substituted or unsubstituted C1-C20 alkyl group, a substituted or unsubstituted C6-C30 aryl group, a substituted or unsubstituted C3-C20 heteroaryl group, or a substituted or unsubstituted C3-C20 carbocyclic group, $R_2$ through $R_5$ each independently represents a hydrogen atom, a nitro group, an amino group, a hydroxy group, a halogen atom, a cyano group, a carboxyl group, a substituted or unsubstituted C1-C20 alkyl group, a substituted or unsubstituted C2-C20 alkenyl group, a substituted or unsubstituted C2-C20 alkynyl group, a substituted or unsubstituted C1-C20 alkoxy group, a substituted or unsubstituted C2-C20 alkoxy carbonyl group, a substituted or unsubstituted C6-C30 aryl, a substituted or unsubstituted C3-C20 carbocylic group, a substituted or unsubstituted C3-C30 heteroaryl group, a substituted or unsubstituted C2-C20 alkylcarbonyl group, a substituted or unsubstituted C7-C30 arylcarbonyl group, or a substituted or unsubstituted C4-C30 heteroarylcarbonyl group; and n is in a range of 1 to 20.

Another embodiment of the present invention provides a first electrolyte for a lithium air battery, the first electrolyte including the lithium ion conductive polymers, the compounds of Formula 1, and the lithium salts. Another embodiment of the present invention provides a lithium air battery including the first electrolyte.

The lithium air battery may use an aqueous electrolyte or a non-aqueous electrolyte as an electrolyte between a positive electrode and a negative electrode. When a non-aqueous electrolyte is used, a reaction occurs in the lithium air battery according to a reaction mechanism such as Reaction Scheme 1 below:

Reaction Scheme 1

During discharge, lithium generated from the negative electrode reacts with oxygen gas entering the battery via the positive electrode, and thus lithium peroxide ($Li_2O_2$) is produced and the oxygen is reduced (oxygen reduction reaction: ORR). Conversely, during charge, the lithium peroxide is reduced, the oxygen is oxidized and oxygen gas evolves (oxygen evolution reaction: OER).

However, such a type of lithium air battery has many problems caused by electrolyte evaporation at the positive electrode. An example of these problems may be reduction of battery capacity due to reduction of the interfacial area between a positive electrode and an electrolyte. Also, as lithium salts are extracted and/or the concentration of lithium salts relatively increases and the concentration of discharge products increase, discharge characteristics and lifespan of the battery are reduced.

The lithium air battery according to an embodiment of the present invention uses a first electrolyte including the lithium ion conductive polymers, the compounds of Formula 1, and the lithium salts between the lithium ion conductive solid electrolyte membrane and the positive electrode, and thus evaporation of the electrolyte is effectively inhibited.

Referring to FIG. 1, a working principle of the lithium air battery according to these embodiments is as described below. The lithium air battery 10 has a structure in which a lithium ion conductive solid electrolyte membrane 13 is placed between a positive electrode 11 and a negative electrode 12. All or part of first electrolyte 16 including lithium ion conductive polymers 14, compounds 15 of Formula 1 and lithium salts (not shown) may be impregnated in the positive electrode 11.

The lithium ion conductive polymers 14 of the first electrolyte 16 inhibit evaporation of the compounds 15 of Formula 1. For example, the lithium ion conductive polymers 14 contain the compounds 15 of Formula 1 in a polymeric matrix as shown in FIG. 1, and thus, the inhibitory effect on solvent evaporation is superior.

According to an embodiment, the first electrolyte 16 includes polyethylene oxides as lithium ion conductive polymers, tetraglymes ($CH_3O$—$(CH_2CH_2O)_4$—$CH_3$) as compounds 15 of Formula 1, and lithium bis(trifluoromethanesulfonyl)imides (LiTFSI) as lithium salts.

Since the polyethylene oxide and tetraglyme have similar base units, their interaction is strong when they are mixed together, and thus the inhibitory effect of tetraglyme on solvent evaporation is superior.

Hereinafter, a first electrolyte of the lithium air battery according to an embodiment and the lithium air battery including the first electrolyte will be described in more detail. The first electrolyte includes lithium ion conductive polymers, compounds of Formula 1 and lithium salts.

For the lithium ion conductive polymers, hydrophilic matrix polymers with lithium ion conductivity may be used.

Each of the hydrophilic matrix polymers may be one or more polymers selected from the group consisting of an alkylene oxide polymer, a hydrophilic acrylic polymer, and a hydrophilic methacrylic polymer. For example, the polymer may be an alkylene oxide polymer.

The alkylene oxide polymer is a polymer with an alkylene oxide chain in which alkylene groups and ether oxygens are alternatively arranged, and the chain of alkylene oxide may have branches.

Example of the alkylene oxide polymer may be one or more polymers selected from the group consisting of polypropylene oxide, polyethylene oxide, and ethylene oxide/propylene oxide copolymer.

A lithium ion conductive polymer having a weight-average molecular weight of about 2,000 or greater, for example from about 2,000 to about 1,000,000, may be used but is not limited thereto. A lithium ion conductive polymer having a weight-average molecular weight of any range wherein dendrite formation in a battery may be inhibited may be used.

Each of the hydrophilic acrylic polymer and hydrophilic methacrylic polymer refers to an acrylic polymer and methacrylic polymer with hydrophilic groups.

For the hydrophilic groups, any functional group that may induce the polymer to have hydrophilic properties may be used, for example, a phosphate group or a sulfonic acid group.

Each of the compounds of Formula 1 has $R_1$ and $R_6$ that are each a hydrogen atom or an alkyl group of C1-C10, $R_2$ through $R_5$ that are each a hydrogen atom or an alkyl group of C1-C10, and n is in a range of 1 to 8.

An example of the compounds of Formula 1 is tetraglyme $(CH_3O-(CH_2CH_2O)_4-CH_3)$.

The concentration of the lithium ion conductive polymers is in a range of about 1 to about 90 parts by weight based on 100 parts by weight of the compounds of Formula 1 in the electrolyte.

The first electrolyte may further include a solvent.

The concentration of the lithium salts is in a range of about 0.1 to about 70 parts by weight based on 100 parts by weight of a total weight of the compounds of Formula 1 and the lithium ion conductive polymers.

When the concentrations of the compounds of Formula 1 and lithium salts are within the above range, the first electrolyte may have an appropriate conductivity and viscosity, and thus may exhibit excellent electrolytic performance, allowing ions to effectively migrate.

The first electrolyte may further include one or more solvents selected from the group consisting of an aprotic solvent and water.

The concentration of the one or more solvents selected from the group consisting of an aprotic solvent and water may be in a range of about 0.1 to about 100 parts by weight based on 100 parts by weight of the compounds of Formula 1.

For the aprotic solvent, a carbonate, an ester, an ether, a ketone, an amine, or a phosphine solvent may be used.

For the carbonate solvent, dimethyl carbonate (DMC), diethyl carbonate (DEC), ethylmethyl carbonate (EMC), dipropyl carbonate (DPC), methylpropyl carbonate (MPC), ethylpropyl carbonate (EPC), ethylmethyl carbonate (methylethyl carbonate, MEC or EMC), ethylene carbonate (EC), propylene carbonate (PC), butylene carbonate (BC), or the like may be used.

For the ester solvent, methyl acetate, ethyl acetate, n-propyl acetate, dimethyl acetate, methylpropionate, ethylpropionate, γ-butyrolactone, decanolide, valerolactone, mevalonolactone, caprolactone, or the like may be used.

For the ether solvent, dibutylether, tetraglyme, diglyme, dimethoxyethane, 2-methyltetrahydrofuran, tetrahydrofuran, or the like may be used, and for the ketone solvent, cyclohexanone or the like may be used.

Also, for the amine solvent, triethylamine, triphenylamine, or the like may be used. For the phosphine solvent, triethylphosphine or the like may be used, but is not necessarily limited thereto, and any aprotic solvent available in a field of the art may be used.

Also, for the aprotic solvent, a nitrile such as R—CN (where R is a hydrocarbon group of a linear, branch, or sphere structure with 2 to 20 carbon atoms, and may include a double bond, an aromatic ring, or an ether bond) or the like, an amide such as dimethylformamide or the like, or a sulfolane such as 1,3-dioxolane or the like, may be used.

The aprotic solvent may be used alone or as a mixture of one or more of the above solvents, and the mixing ratio in the case of using the mixture of the one or more of the above solvents may be appropriately adjusted according to battery performance which can be determined by a person of ordinary skill in the art.

Also, the first electrolyte may include an ionic solution.

For the ionic solution, a linear or branch substituted compound composed of a cation such as ammonium, imidazolium, or piperidinium and an anion such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, $(CN)_2N^-$, or the like may be used.

If the solvent of the first electrolyte according to this embodiment is a polar solvent, and if the lithium ion conductive hydrophilic polymers are used together, inhibition of electrolyte evaporation is highly effective.

According to this embodiment, the first electrolyte includes polyethyleneoxides, tetraglymes and lithium salts. Here, lithium trifluoromethanesulfonylimide $[Li(CF_3SO_2)_2N]$, is used for the lithium salts.

All or part of the first electrolyte between the lithium ion conductive solid electrolyte membrane and the positive electrode may be impregnated in the positive electrode.

The first electrolyte may be prepared through a process of, for example, mixing the lithium ion conductive polymers, the compounds of Formula 1, and the lithium salts at a temperature within a range of about 40 to about 80° C., for example about 60° C., for 10 minutes or longer. After such a process, each component of the first electrolyte may be evenly dispersed.

In the first electrolyte, the lithium salts may be dissolved in the solvent to operate as a source of lithium ions in the battery, and promote migration of the lithium ions at the negative electrode and between the lithium ion conductive electrolyte membrane and the negative electrode.

For the lithium salts, at least one salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiF, LiBr, LiCl, LiI and lithium bis(oxalato)borate (LiBOB) may be used The concentration of the lithium salts may be in a range about 0.01 to about 10 M, for example about 0.1 to about 2.0 M. When the concentration of the lithium salt is within this range, the first electrolyte may have an appropriate conductivity and viscosity, and thus may exhibit excellent electrolytic performance, allowing ions to effectively migrate.

Metal salts other than the lithium salts may be additionally included, for example $AlCl_3$, $MgCl_2$, NaCl, KCl, NaBr, KBr, $CaCl_2$, etc.

Meanwhile, for the positive electrode using oxygen as a positive electrode active material, a conductive material may be used. Also, the conductive material may be porous. Thus, any material with pores and conductivity, for example a porous carbonate material, may be used to form the positive electrode. Examples of the carbonate material may include carbon black, graphite, graphene, active carbon, carbon fabric, or the like. Also, a metal conductive material such as metal fabric, metal mesh, or the like may be used. Also, a metallic powder such as copper, silver, nickel, aluminum, or the like may be included. An organic conductive material such as a polyphenylene derivative or the like may be used. Such conductive materials may be used alone or as a mixture thereof.

A catalyst may be added to the positive electrode for oxidation/reduction of oxygen. For the catalyst, a precious metal catalyst such as platinum (Pt), gold (Au), silver (Ag), palladium (Pd), ruthenium (Ru), rhodium (Rh), or osmium (Os), an oxide catalyst such a as manganese oxide, an iron oxide, a cobalt oxide, or a nickel oxide, or an organic metal catalyst such as cobalt phthalocyanine may be used but is not limited thereto, and any material available in the field of the art as a catalyst for oxidation/reduction of oxygen may be used.

Also, the catalyst may be contained in a carrier. The carrier may be an oxide, a zeolite, a clay mineral, carbon, or the like. The oxide may include one or more oxides selected from the group consisting of alumina, silica, zirconium oxide, titanium dioxide, etc. The oxide may include one or more metals selected from the group consisting of cesium (Ce), praseodymium (Pr), samarium (Sm), europium (Eu), terbium (Tb), thulium (Tm), ytterbium (Yb), stibium (antimony. Sb), bismuth (Bi), vanadium (V), chromium (Cr), manganese (Mn), iron (Fe), cobalt (Co), nickel (Ni), copper (Cu), niobium (Nb), molybdenum (Mo) and tungsten (W). The carbon may be carbon black such as KETJENBLACK® (trademark of Akzo Nobel), acetylene black, channel black, lamp black, etc., graphite such as natural graphite, artificial graphite, expanded graphite, etc., active carbon, carbon fabric, or the like but is not limited thereto, and any material available as a carrier in the art may be used.

The positive electrode may further include a binder. The binder may include a thermoplastic resin or a thermosetting resin. For example, polyethylene, polyprolylene, polytetrafluoroethylene (PTFE), polyvinylidene fluoride (PVDF), styrene-butadiene rubber, tetrafluoroethylene-perfluoroalkylvinylether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinylether-tetrafluoroethylene copolymer, ethylene-acrylic acid copolymer or the like may be used alone or as a mixture thereof but the binder is not limited thereto, and any material available as a binder in the art may be used.

The positive electrode may be prepared by, for example, after mixing the catalyst for oxidation/reduction of oxygen, the conductive material, and the binder and preparing a positive electrode slurry by adding an appropriate solvent, drying or compression molding a current collector for selectively increasing electrode density. Also, the positive electrode may selectively include lithium oxide. Moreover, the catalyst for oxidation/reduction of oxygen may selectively be omitted.

For the current collector, a porous material in the shape of a net, mesh, or the like or a porous metal plate such as stainless steel, nickel, aluminum or the like may be used for rapid oxygen dispersion but the current collector is not limited thereto, and any current collector available in the art may be used. The current collector may be coated with an oxidization-resistance metal or alloy coating film to prevent its oxidation.

For the negative electrode including lithium in the lithium air battery, a material which may intercalate or deintercalate a lithium metal, a lithium metal-based alloy, or a lithium intercalatable or deintercalatable compound may be used, but the negative electrode is not limited thereto, and any negative electrode available in the art which may include lithium or may intercalate or deintercalate lithium may be used. Since the negative electrode influences battery capacity, the negative electrode may be, for example, lithium metal. Examples of the lithium metal-based alloy may be an alloy of lithium and at least one other metal selected from the group consisting of aluminum, tin, magnesium, indium, calcium, titanium, and vanadium.

In addition, a separator may be disposed between the negative electrode and the positive electrode. The separator may be any separator having a composition which may be used in a lithium air battery. For example, a polymer non-woven fabric such as a polypropylene non-woven fabric or a polyphenylene sulfide non-woven fabric, a porous film of an olefin resin such as polyethylene or polypropylene, or a combination of at least two thereof may be used.

The lithium ion conductive solid electrolyte membrane is formed on a surface of the negative electrode so as to serve as a protective layer protecting the lithium contained in the negative electrode from the electrolyte.

The lithium ion conductive solid electrolyte membrane may include one or more materials selected from the group consisting of an inorganic material and a solid polymer electrolyte component.

The lithium ion conductive solid electrolyte membrane may be a glass-ceramic solid electrolyte or a stack structure of the glass-ceramic solid electrolyte and the solid polymer electrolyte component. Hereinafter, such a lithium ion conductive solid electrolyte membrane will be described in detail.

The lithium ion conductive solid electrolyte membrane may include an inorganic material, for example, lithium ion conductive glass, lithium-ion conductive crystal (ceramic or glass-ceramic), or a mixture thereof. To attain chemical stability, the lithium ion conductive solid electrolyte membrane may include an oxide.

When the lithium ion conductive solid electrolyte membrane includes a large amount of lithium-ion conductive crystal, high ion conductance may be obtained. For example, the lithium ion conductive solid electrolyte membrane may include lithium-ion conductive crystals having an amount of 50 wt % or more, or 55 wt % or more, based on the total weight of the lithium ion conductive solid electrolyte membrane.

Examples of the lithium-ion conductive crystal may include a crystal having a perovskite structure having lithium ion conductance, such as $Li_3N$, LISICON, $La_{0.55}Li_{0.35}TiO_3$, or the like, $LiTi_2P_3O_{12}$ having a NASICON-type structure, and a glass-ceramic for precipitating these crystals.

The lithium-ion conductive crystal may be, for example, $Li_{1+x+y}(Al, Ga)_x(Ti, Ge)_{2-x}Si_yP_{3-y}O_{12}$ (where $0 \leq x \leq 1$, $0 \leq y \leq 1$, for example, $0 \leq x \leq 0.4$, $0 < y \leq 0.6$, or $0.1 \leq x \leq 0.3$, $0.1 < y \leq 0.4$). To attain high ion conductance, the lithium-ion conductive crystal may not include a grain boundary that interrupts ion conduction. For example, since glass-ceramic may rarely include a pore or a grain boundary that interrupts ion conduction, high ion conductance and excellent chemical stability may be attained.

Examples of the lithium ion conductive glass-ceramic include lithium-aluminum-germanium-phosphate (LAGP), lithium-aluminum-titanium-phosphate (LATP), lithium-aluminum-titanium-silicon-phosphate (LATSP), and the like.

For example, when a glass-ceramic matrix includes a composite of $Li_2O$—$Al_2O_3$—$TiO_2$—$SiO_2$—$P_2O_5$, and the glass-ceramic matrix is heat-treated and crystallized, the main crystalline phase is $Li_{1+x+y}Al_xTi_{2-x}Si_yP_{3-y}O_{12}$ ($0 \leq x \leq 1$, and $0 \leq y \leq 1$), where x and y satisfy, for example, $0 \leq x \leq 0.4$ and $0 < y \leq 0.6$, or $0.1 \leq x \leq 0.3$ and $0.1 < y \leq 0.4$.

In this case, the pores and the grain boundary that interrupt ion conduction refer to materials that interrupt ion conduction, which materials reduce the total ion conductance of an inorganic material including lithium ion conductive crystals to 1/10 of the ion conductance of the lithium ion conductive crystals themselves or less.

The glass-ceramic refers to a material obtained by heat-treating glass to precipitate crystalline phases from the glass phases, and includes an amorphous solid and crystals. In addition, the glass-ceramic may include a material whose phase is transformed from all glass phases to crystalline phases, for example, such as a material having crystallization of 100 wt %. Although the glass-ceramic material has a crystallization of 100 wt %, pores may rarely exist between crystalline particles or in crystals.

Since the lithium ion conductive solid electrolyte membrane includes a large amount of glass-ceramic, high ion conductance may be attained. Thus, 80 wt % of lithium ion conductive glass-ceramic or more may be included in the lithium ion conductive solid electrolyte membrane. In order to further increase ion conductance, the amount of the lithium ion conductive glass-ceramic included in the lithium ion conductive solid electrolyte membrane may be 85 wt % or more, or 90 wt % or more.

$Li_2O$ components included in the glass-ceramic provide carriers of $Li^+$ ions, and are useful to attain lithium ion conductance. In order to easily attain high ion conductance, the amount of the $Li_2O$ components may be, for example, 12 wt % or more, 13 wt % or more, or 14 wt %. If there is an excessively high amount of the $Li_2O$ component thermal stability of the glass may be easily reduced, and conductance of the glass-ceramic may be easily reduced. Thus, an upper limit of the amount of the $Li_2O$ components may be 18 wt %, 17 wt % or 16 wt %.

$Al_2O_3$ components included in the glass-ceramic may improve thermal stability of the glass-ceramic matrix. Simultaneously, $Al^{3+}$ ions are made to form a solid solution in the crystalline phase, thereby improving lithium ion conductance. In order to further attain this effect, the lower limit of the amount of the $Al_2O_3$ components may be 5 wt %, 5.5 wt %, or 6 wt %. However, if the amount of the $Al_2O_3$ component exceeds 10 wt %, thermal stability of the glass may deteriorate easily, and conductance of the glass-ceramic may also be reduced. Thus, the upper limit of the amount of the $Al_2O_3$ components may be 10 wt %, 9.5 wt %, or 9 wt %.

$TiO_2$ components included in the glass-ceramic may facilitate formation of glass, may constitute the crystalline phase, and may be useful in glass and crystal. To change the crystalline phase to the glass phase, the crystalline phase is a main phase, and is precipitated from glass. In order to easily attain high ion conductance, the lower limit of the amount of the $TiO_2$ components may be 35 wt %, 36 wt %, or 37 wt %. If there is an excessively high amount of the $TiO_2$ components, thermal stability of glass may be easily reduced, and conductance of the glass-ceramic may be easily reduced. Thus, the upper limit of the amount of the $TiO_2$ component may be 45 wt %, 43 wt %, or 42 wt %.

$SiO_2$ components included in the glass-ceramic may improve the melting characteristics and thermal stability of the glass-ceramic matrix. Simultaneously, $Si^{4+}$ ions are made to form a solid solution in the crystalline phase, thereby improving lithium ion conductance. In order to further attain this effect, the lower limit of the amount of the $SiO_2$ component may be 1 wt %, 2 wt %, or 3 wt %. However, if there is an excessively high amount of the $SiO_2$ component, conductance is reduced. Thus, the upper limit of the amount of the $SiO_2$ component may be 10 wt %, 8 wt %, or 7 wt %.

$P_2O_5$ components included in the glass-ceramic may be useful to form glass, and may also constitute the crystalline phase. When the amount of the $P_2O_5$ component is 30% or less, it is difficult to change the crystalline phase to a glass phase. Thus, the lower limit of the $P_2O_5$ components may be 30 wt %, 32 wt %, or 33 wt %. If the amount of the $P_2O_5$ component exceeds 40 wt %, it is difficult to precipitate crystalline phase from glass, and it is difficult to attain the desired property. Thus, the upper limit of the amount of the $P_2O_5$ components may be 40 wt %, 39 wt %, or 38 wt %.

When the above-described composites are used, glass may be easily obtained by casting melted glass. Glass-ceramic having the glass phase obtained by heat-treating the glass may have a high lithium ion conductance of $1 \times 10^{-3}$ $S \cdot cm^{-1}$.

Other than the above-described composites, if glass-ceramic has a crystalline structure similar to the above-described composites, $Al_2O_3$ components may be entirely or partially substituted by $Ga_2O_3$ components, and $TiO_2$ components may be entirely or partially substituted by $GeO_2$ components. In addition, when the glass-ceramic is prepared, in order to reduce the melting point of the glass-ceramic or to improve stability of glass, a trace of other materials may be added as long as ion conductance may not be seriously reduced.

In some embodiments, the lithium ion conductive solid electrolyte membrane may further include a solid polymer electrolyte, in addition to the glass-ceramic. The solid polymer electrolyte may be polyethylene oxide doped with a lithium salt. Examples of the lithium salt include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and the like.

The solid polymer electrolyte and the glass-ceramic may constitute a stack structure. The glass-ceramic may be placed between a first solid polymer electrolyte and a second solid polymer electrolyte, which include the above-described composite.

As described above, the lithium ion conductive solid electrolyte membrane is formed on one surface of a negative electrode in which ions are intercalatable and deintercalatable, and protects the negative electrode so as to prevent the negative from reacting with the first electrolyte. Thus, only lithium ions may be passed through the lithium ion conductive solid electrolyte membrane.

The lithium ion conductive solid electrolyte membrane may be a single layer or multiple layers.

The second electrolyte may be placed between the negative electrode and the solid electrolyte membrane.

The second electrolyte may use a liquid electrolyte including a non-aqueous solvent and lithium salts, an inorganic solid electrolyte membrane such as $Cu_3N$, $Li_3N$, LiPON, a polymer electrolyte membrane, or a combination thereof.

The non-aqueous solvent includes the aprotic solvent of the first electrolyte and the compounds of Formula 1 mentioned above.

The lithium air battery according to an embodiment may prevent problems caused by evaporation of the electrolyte since evaporation of the first electrolyte, which is an electrolyte on one side of the positive electrode, is inhibited. Therefore, separation of the electrode and the electrolyte at an interface may be prevented, and thus cell performances such as lifespan, electrical characteristics, etc. may be improved.

The term "air" used herein is not limited to atmosphere, and may include a composition of air including additional oxygen or pure oxygen gas. This wide definition of the term "air" may also be applied to, for example, an air battery, an air positive electrode, or the like.

The lithium air battery may be a lithium primary battery or a lithium secondary battery. In addition, the lithium air battery is not particularly limited in shape, and the shape of the lithium air battery may be, for example, a coin-type, a button-type, a sheet-type, a laminated-type, a cylindrical-type, a flat-type, or a horn-type. In addition, the lithium air battery may be applied to a large battery for electric vehicles.

Figure 2:
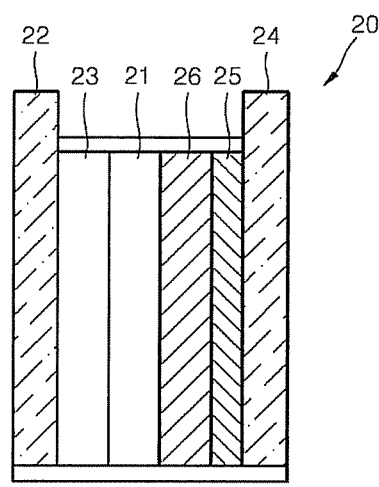
FIG. 2 is a schematic diagram of a lithium air battery according to an embodiment of the present invention.

FIG. 2 is a schematic diagram of a lithium air battery 20 according to an embodiment of the present invention. In the lithium air battery 20, a positive electrode 23 using oxygen formed on a first current collector 22 as an active material, lithium ion conductive polymers according to an embodiment disposed between a second current collector 24 and a negative electrode 25, which is capable of intercalating and deintercalating lithium, adjacent to the second current collector 24, a first electrolyte 21 including compounds of Formula 1 and lithium salts, and a lithium ion conductive solid electrolyte membrane 26 are formed.

A separator (not shown) may be disposed between the lithium ion conductive solid electrolyte membrane 26 and the negative electrode 25. A second electrolyte membrane (not shown) may be formed between the separator and the negative electrode 25. Constituent elements of FIG. 2 are not limited to the thicknesses shown in the drawing.

Hereinafter are definitions of substituents used in the chemical formulas.

The term "alkyl" used in a chemical formula refers to fully saturated branched or unbranched (or straight chain or linear) hydrocarbons.

Unlimited examples of the alkyl may be methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, n-heptyl, etc.

One or more hydrogen atoms of the "alkyl" may be substituted with a halogen atom, a halogen atom substituted C1-C20 alkyl group (example: $CCF_3$, $CHCF_2$, $CH_2F$, $CCl_3$, etc.), a C1-C20 alkoxy group, a C2-C20 alkoxyalkyl group, a hydroxy group, a nitro group, a cyano group, an amino group, an alkylamino group, an amidino group, a hydrazine group, a hydrazone group, a carboxyl group or its salt, a sulfonyl group, or a sulfamoyl group, a sulfonic acid group or its salt, a phosphoric acid group or its salt, or a C2-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen atom" includes fluorine, bromine, chlorine, iodine, etc.

The term "alkoxy" used in a chemical formula refers to alkyl-O—, and the alkyl is as described above. Examples of the alkoxy are methoxy, ethoxy, propoxy, 2-propoxy, butoxy, tert-butoxy, pentyloxy, hexyloxy, etc. One or more hydrogen atoms of the alkoxy may be substituted with the same substituent groups described for the alkyl group above.

In a chemical formula, an unsubstituted alkenyl group refers to a group containing one or more carbon double bonds in the middle or at the terminal end of the unsubstituted alkyl group defined above. Examples of such group include ethenyl, propenyl, butenyl, etc. At least one hydrogen atom of the alkenyl group may be substituted with the same substituent groups as previously described for the substituted alkyl group above.

In a chemical formula, an unsubstituted alkynyl group refers to a group containing one or more carbon triple bonds in the middle or at the terminal end of the alkyl group defined above. At least one hydrogen atom of the alkynyl group may be substituted with the same substituent groups as previously described for the substituted alkyl group above. Examples of the unsubstituted or substituted alkynyl group include acetylene, propylene, phenylacetylene, naphthylacetylene, isopropyl acetylene, t-butyl acetylene, diphenyl acetylene, etc.

The term "aryl" used in a chemical formula refers to an aromatic hydrocarbon system containing one or more rings, used alone or in combinations.

The term "aryl" includes a group wherein aromatic rings are fused in one or more cycloalkyl rings. Examples of the aryl may be phenyl, naphthyl, etc.

Also, one or more hydrogen atoms in the aryl group may be substituted with the same substituent groups as previously described for the alkyl group above.

The term "heteroaryl" used in a chemical formula refers to aromatic organic compounds including one or more heteroatoms selected from N, O, P or S, and the remaining ring atoms are C. For example, the heteroaryl group may include 1 to 5 heteroatoms and may include 5 to 10 ring members, wherein S and N may be oxidized to various oxidation states.

Examples of a monocyclic heteroaryl group are thienyl, furyl, pyrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isooxazol-3-yl, isooxazol-4-yl, isooxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, or 5-pyrimidin-2-yl.

The term "heteroaryl" also refers to a group in which a heteroaromatic ring is fused to one or more aryl, cycloaliphatic, or heterocyclyl rings.

Representative examples of a bicyclic heteroaryl are indolyl, isoindolyl, indazolyl, indolizinyl, purinyl, quinolizinyl, quinolinyl, isoquinolinyl, etc. One or more hydrogen atoms in the heteroaryl group may be substituted with the same substituent groups as previously described for the alkyl group above.

The term "sulfonyl" includes R"—$SO_2$—, wherein R" is hydrogen, alkyl, aryl, heteroaryl, aryl-alkyl, heteroaryl-alkyl, alkoxy, aryloxy, cycloalkyl, or heterocyclyl.

The term "sulfamoyl" includes $H_2NS(O)_2$—, alkyl-NHS$(O)_2$—, $(alkyl)_2NS(O)_2$—, aryl-NHS$(O)_2$—, alkyl-(aryl)-NS$(O)_2$—, $(aryl)_2NS(O)_2$—, heteroaryl-NHS$(O)_2$—, (aryl-alkyl)-NHS$(O)_2$—, or (heteroaryl-alkyl)-NHS$(O)_2$—.

One or more hydrogen atoms in the sulfamoyl group may be substituted with the same substituent groups as previously described for the alkyl group above.

The term "amino" includes compounds where a nitrogen atom is covalently bonded to at least one carbon or heteroatom. The amino group also includes —$NH_2$ and substituted moieties.

The term "alkyl amino" includes alkyl amino groups wherein the nitrogen is bound to at least one additional alkyl group and arylamino and diarylamino groups wherein the nitrogen is bound to at least one or two independently selected aryl groups, respectively.

The term "carbocyclic" refers to a group with a ring system of 5 to 10 carbon atoms such as cyclohexyl group, etc., and one or more hydrogen atoms in the carbocyclic group may be substituted with the same substituent groups as previously described for the alkyl group above.

The alkoxycarbonyl group, arylcarbonyl group, and heteroarylcarbonyl group may be substituted with the same substituent groups as previously described for the alkyl group above.

Hereinafter, examples of the present invention will be described in detail. However the examples are for illustrative purposes only and are not intended to limit the scope of the present invention.

Preparation Example 1

7 g of lithium bis(trifluoromethanesulfonyl)imide (LiTFSI) was dissolved in 20 mL of tetraglyme and mixed with 4 g of polyethylene oxide (PEO) (whose molecular weight is about 600,000, Aldrich) to prepare a first electrolyte.

Comparative Preparation Example 1

As a first electrolyte, 1 M of a LiTFSI/tetraglyme solution was prepared by mixing 7 g of LiTFSI with 20 mL of tetraglyme.

Comparative Preparation Example 2

0.5 g of LiTFSI was dissolved in 50 mL of acetonitrile, and 1.4 g of PEO was added to the resultant, and was stirred for 12 hours. Then, the resulting solution was put on a PTFE plate, was dried for 24 hours at 20° C. in a nitrogen atmosphere, and was vacuum-dried for 24 hours at 120° C. to prepare a first electrolyte.

Example 1: Preparation of Lithium Air Battery

By dissolving 7 g of LiTFSI in 20 ml of propylene carbonate (PC), 1 M of a LiTFSI/PC solution was prepared as a second electrolyte.

As the second electrolyte, 1 M of a LiTFSI/PC solution was impregnated in a polypropylene separator (CELGARD® 3501, Celgard LLC), and a separator impregnated with 1 M of a LiTFSI/PC solution was prepared.

Also, a first electrolyte was separately prepared by mixing 4 g of PEO, 20 ml of tetraglyme, and 7 g of LiTFSI at 60° C.

A $Li_{1.4}Ti_{1.6}Al_{0.4}P_3O_{12}$ (LATP) solid electrolyte membrane with a thickness of about 150 μm, the separator impregnated with 1 M of a LiTFSI/PC solution, a Ni tab with a thickness of about 100 μm, and a copper current collector with a thickness of about 20 μm were wrapped in an aluminum pouch, so a structure with a window formed of the LATP solid electrolyte membrane was prepared.

An aluminum film of which a part is formed of LATP was prepared by forming a hole having a size of 1 cm×1 cm in a center of a polypropylene coated aluminum film having a size of 5 cm×5 cm and then filling the hole with a LATP film (Ohara Corporation) of a size of 1.4 cm×1.4 cm by using adhesives.

A lithium air battery was prepared by injecting the first electrolyte obtained according to the method above to a window of the structure and stacking a positive electrode.

The positive electrode was obtained by mixing 40 parts per weight of carbon (SUPER P® Li, Timcal Corp.), 10 parts per weight of polytetrafluoroethylene (PTFE), and 50 parts per weight of N-Methyl-2-pyrrolidone (NMP) to prepare a positive electrode slurry, coating the slurry on a positive electrode current collector, and drying.

Comparative Example 1

Except for using 1 M of the LiTFSI/tetraglyme solution prepared in Comparative Preparation Example 1 as a first electrolyte which is an electrolyte for the positive electrode, a lithium air battery was prepared in the same manner as that of Example 1.

Comparative Example 2

Except for using the solid electrolyte prepared in Comparative Preparation Example 2 as the first electrolyte, a lithium air battery was prepared in the same manner as that of Example 1.

Evaluation Example 1: Evaluation of Electrolyte Evaporation Rate

Evaporation rates of the electrolyte were evaluated by observing the weight change as a function of time of the first electrolytes prepared according to Preparation Example 1 and Comparative Preparation Example 1.

Figure 3:
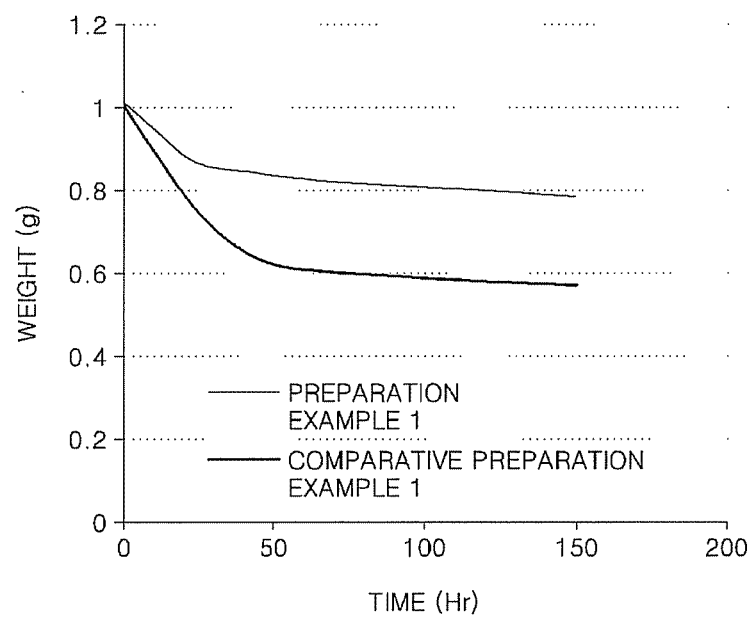
FIG. 3 is a graph showing results of observed weight change as a function of time of first electrolytes prepared according to Preparation Example 1 and Comparative Example 1.

The evaluation result is as shown in FIG. 3. Referring to FIG. 3, it is seen that the evaporation rate of the first electrolyte of Preparation Example 1 was inhibited compared to the first electrolyte of Comparative Preparation Example 1.

Figure 4:
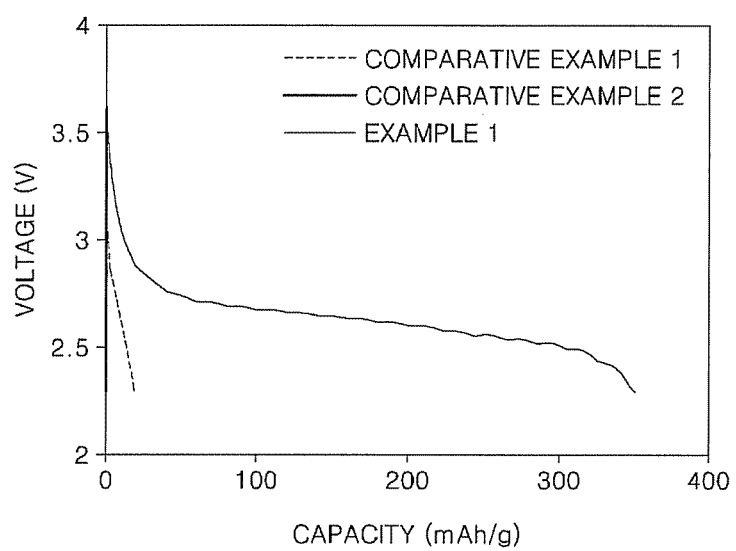
FIG. 4 is a discharge graph of lithium air batteries according to Example 1, Comparative Example 1 and Comparative Example 2.

Evaluation Example 2: Evaluation of Discharging Characteristic of Lithium Air Battery The lithium air batteries prepared in Example 1 and Comparative Example 1 and 2 were discharged with a constant current of 0.2 mA/cm$^2$ at 25° C. and 1 atm to 2.2 V (vs. Li), and the result is shown in FIG. 4. Referring to FIG. 4, it is seen that the discharging characteristic of the lithium air battery of Example 1 was improved compared to the lithium air batteries of Comparative Examples 1 and 2.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium air battery comprising:
a negative electrode;
a lithium ion conductive solid electrolyte membrane; and
a positive electrode using oxygen as a positive electrode active material,
wherein a first electrolyte comprising lithium ion conductive polymers having a weight average molecular weight greater than 2000 grams per mole, compounds represented by Formula 1 below, and lithium salts are included between the lithium ion conductive solid electrolyte membrane and the positive electrode:

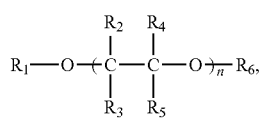

Formula 1 wherein $R_1$ and $R_6$ each independently represents a hydrogen atom, a nitro group, an amino group, a halogen atom, a cyano group, a carboxyl group, a substituted or unsubstituted C1-C20 alkyl group, a substituted or unsubstituted C6-C30 aryl group, a substituted or unsubstituted C3-C20 heteroaryl group, or a substituted or unsubstituted C3-C20 carbocyclic group, $R_2$ through $R_5$ each independently represents a hydrogen atom, a nitro group, an amino group, a hydroxy group, a halogen atom, a cyano group, a carboxyl group, a substituted or unsubstituted C1-C20 alkyl group, a substituted or unsubstituted C2-C20 alkenyl group, a substituted or unsubstituted C2-C20 alkynyl group, a substituted or unsubstituted C1-C20 alkoxy group, a substituted or unsubstituted C2-C20 alkoxy carbonyl group, a substituted or unsubstituted C6-C30 aryl, a substituted or unsubstituted C3-C20 carbocylic group, a substituted or unsubstituted C3-C30 heteroaryl group, a substituted or unsubstituted C2-C20 alkylcarbonyl group, a substituted or unsubstituted C7-C30 arylcarbonyl group, or a substituted or unsubstituted C4-C30 heteroarylcarbonyl group, and n is in a range of 1 to 20, wherein the amount of the lithium ion conductive polymers is in a range of about 1 to about 90 parts by weight based on 100 parts by weight of the compounds of Formula 1 in the electrolyte; and the lithium ion conductive polymer is one or more polymers selected from the group consisting of polypropylene oxide, polyethylene oxide, polyethylene oxide/polypropylene oxide copolymer.

2. The lithium air battery of claim 1, wherein each of the compounds of Formula 1 comprises:

$R_1$ and $R_6$ that are each a hydrogen atom or an alkyl group of C1-C10;
$R_2$ through $R_5$ that are each a hydrogen atom or an alkyl group of C1-C10; and
n is in a range of 1 to 8.

3. The lithium air battery of claim 1, wherein the compounds of Formula 1 are tetraglyme ($CH_3O$—$(CH_2CH_2O)_4$—$CH_3$).

4. The lithium air battery of claim 1, wherein the first electrolyte further comprises one or more solvents selected from the group consisting of an aprotic solvent and water.

5. The lithium air battery of claim 1, wherein the amount of the lithium salts is in a range of about 0.1 to about 70 parts by weight based on 100 parts by weight of the total weight of the compounds of Formula 1 and the lithium ion conductive polymers.

6. The lithium air battery of claim 1, wherein the lithium ion conductive solid electrolyte membrane is disposed between the negative electrode and the positive electrode or formed on one surface of the negative electrode.

7. The lithium air battery of claim 1, wherein a part of the first electrolyte is impregnated in the positive electrode.

8. The lithium air battery of claim 1, wherein the lithium ion conductive solid electrolyte membrane comprises one or more selected from the group consisting of an inorganic material and a solid polymer electrolyte component.

9. The lithium air battery of claim 1, wherein the lithium ion conductive solid electrolyte membrane is a glass-ceramic solid electrolyte or a stack structure of the glass-ceramic solid electrolyte and a solid polymer electrolyte.

10. The lithium air battery of claim 1, wherein a second electrolyte may be further disposed between the negative electrode and the lithium ion conductive solid electrolyte membrane.

11. The lithium air battery of claim 10, wherein the second electrolyte is a liquid electrolyte comprising a non-aqueous solvent and lithium salts, an inorganic solid electrolyte membrane, a solid polymer electrolyte membrane, or a combination thereof.

12. The lithium air battery of claim 1, wherein a separator is further disposed between the lithium ion conductive solid electrolyte membrane and the positive electrode.

13. The lithium air battery of claim 1, wherein the positive electrode comprises a porous carbon material.

14. The lithium air battery of claim 1, wherein the first electrolyte is a product obtained by mixing the lithium ion conductive polymers, the compounds of Formula 1, and the lithium salts at a temperature within a range of about 40 to about 80° C.

15. An electrolyte for a lithium air battery, the electrolyte comprising lithium ion conductive polymers having a weight average molecular weight greater than 2000 grams per mole, compounds represented by Formula 1 below and lithium salts:

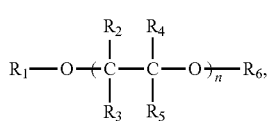

Formula 1 wherein $R_1$ and $R_6$ each independently represents a hydrogen atom, a nitro group, an amino group, a halogen atom, a cyano group, a carboxyl group, a substituted or unsubstituted C1-C20 alkyl group, a substituted or unsubstituted C6-C30 aryl group, a substituted or unsubstituted C3-C20 heteroaryl group, or a substituted or unsubstituted C3-C20 carbocyclic group, $R_2$ through $R_5$ each independently represents a hydrogen atom, a nitro group, an amino group, a hydroxy group, a halogen atom, a cyano group, a carboxyl group, a substituted or unsubstituted C1-C20 alkyl group, a substituted or unsubstituted C2-C20 alkenyl group, a substituted or unsubstituted C2-C20 alkynyl group, a substituted or unsubstituted C1-C20 alkoxy group, a substituted or unsubstituted C2-C20 alkoxy carbonyl group, a substituted or unsubstituted C6-C30 aryl, a substituted or unsubstituted C3-C20 carbocylic group, a substituted or unsubstituted C3-C30 heteroaryl group, a substituted or unsubstituted C2-C20 alkylcarbonyl group, a substituted or unsubstituted C7-C30 arylcarbonyl group, or a substituted or unsubstituted C4-C30 heteroarylcarbonyl group, and n is in a range of 1 to 20; wherein the amount of the lithium ion conductive polymers is in a range of about 1 to about 90 parts by weight based on 100 parts by weight of the compounds of Formula 1 in the electrolyte; and the lithium ion conductive polymer is one or more polymers selected from the group consisting of polypropylene oxide, polyethylene oxide, polyethylene oxide/polypropylene oxide copolymer.

16. The electrolyte for the lithium air battery of claim 15, wherein the compounds of Formula 1 are tetraglyme ($CH_3O$—$(CH_2CH_2O)_4$—$CH_3$).

17. A lithium air battery, wherein the battery comprises the electrolyte of claim 15.

* * * * *